(12) United States Patent
Jethanandani et al.

(10) Patent No.: US 9,537,846 B2
(45) Date of Patent: Jan. 3, 2017

(54) INTEGRITY CHECK OPTIMIZATION SYSTEMS AND METHODS IN LIVE CONNECTIVITY FRAMES

(71) Applicants: Mahesh Jethanandani, Saratoga, CA (US); Ankur Saxena, San Jose, CA (US); Ashesh Mishra, San Jose, CA (US)

(72) Inventors: Mahesh Jethanandani, Saratoga, CA (US); Ankur Saxena, San Jose, CA (US); Ashesh Mishra, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 157 days.

(21) Appl. No.: 14/253,411

(22) Filed: Apr. 15, 2014

(65) Prior Publication Data

US 2015/0295909 A1    Oct. 15, 2015

(51) Int. Cl.
*H04L 29/06* (2006.01)
(52) U.S. Cl.
CPC ........... *H04L 63/08* (2013.01); *H04L 63/1441* (2013.01); *H04L 63/162* (2013.01)
(58) Field of Classification Search
CPC ....................................................... H04L 63/08
USPC ............................................. 726/3; 370/216
See application file for complete search history.

(56) References Cited

U.S. PATENT DOCUMENTS

| 7,768,928 | B2 | 8/2010 | Harel et al. |
| 8,184,526 | B2 | 5/2012 | Duncan et al. |
| 8,687,501 | B1 | 4/2014 | Schultz |
| 2005/0099951 | A1 | 5/2005 | Mohan et al. |
| 2006/0282882 | A1 | 12/2006 | Bajko et al. |
| 2008/0037436 | A1* | 2/2008 | Liu ...................... H04L 12/4633 370/250 |
| 2012/0163189 | A1* | 6/2012 | Allan ...................... H04L 45/50 370/241.1 |

(Continued)

FOREIGN PATENT DOCUMENTS

CN             102857521  A        1/2013

OTHER PUBLICATIONS

Lebovitz et al., Internet Engineering Task Force (IETF) Request for Comments: 6862, Keying and Authentication for Routing Protocols (KARP) Overview, Threats, and Requirements, Mar. 2013.

(Continued)

*Primary Examiner* — Izunna Okeke
*Assistant Examiner* — Hee Song
(74) *Attorney, Agent, or Firm* — Clements Bernard PLLC; Christopher L. Bernard; Lawrence A. Baratta, Jr.

(57) ABSTRACT

A method, a network element, and a network include determining an authentication mechanism between two nodes in a network path; operating the network path; performing connectivity check between the two nodes in the network path; and authenticating specific frames in the connectivity check between the two nodes with the authentication mechanism responsive to the specific frames affecting a state of the network path. The frames can be Bidirectional Forwarding Detection (BFD), Continuity Check Messages (CCMs), etc. Advantageously, the method, network element, and network reduce the computational load of providing authentication while maintaining secure authentication for important frames, i.e., ones that affect the state of the network path.

12 Claims, 5 Drawing Sheets

(56) References Cited

U.S. PATENT DOCUMENTS

2013/0114394 A1  5/2013 Hu et al.
2013/0183935 A1  7/2013 Holostov et al.

OTHER PUBLICATIONS

Moy, Internet Engineering Task Force (IETF) Request for Comments: 2328, OSPF Version 2, Apr. 1998.
Callon, Internet Engineering Task Force (IETF) Request for Comments: 1195, Use of OSI IS-IS for Routing in TCP/IP and Dual Environments, Dec. 1990.
Malkin, Internet Engineering Task Force (IETF) Request for Comments: 2453, RIP Version 2, Nov. 1998.
Katz, Internet Engineering Task Force (IETF) Request for Comments: 5880, Bidirectional Forwarding Detection (BFD), Jun. 2010.
Katz, Internet Engineering Task Force (IETF) Request for Comments: 5881, Bidirectional Forwarding Detection (BFD) for IPv4 and IPv6 (Single Hop), Jun. 2010.
ITU Y.1731 : OAM functions and mechanisms for Ethernet based networks (Jun. 2011).
Aldrin, MPLS OAM Tutorial, NANOG55, Jun. 2012.
H3C, BFD Technology White Paper, Hangzhou H3C Technologies Co., Ltd., 2008.
Sep. 3, 2015 European Search Report issued in European Patent Application No. EP 15163550.

* cited by examiner

| Vers | Diag | Sta | P | F | C | A | D | R | Detect Mult | Length |
|---|---|---|---|---|---|---|---|---|---|---|
| My Discriminator ||||||||||| 
| Your Discriminator ||||||||||| 
| Desired Min TX Interval ||||||||||| 
| Required Min RX Interval ||||||||||| 
| Required Min Echo RX Interval ||||||||||| 
| Auth Type || Auth Len ||||| Authentication Data ||||

FIG. 2

|   | 1 | 2 | 3 | 4 |
|---|---|---|---|---|
|   | 8 7 6 5 4 3 2 1 | 8 7 6 5 4 3 2 1 | 8 7 6 5 4 3 2 1 | 8 7 6 5 4 3 2 1 |
| 1 | MEL / Version (0) | OpCode (CCM=1) | Flags | TLV Offset (70) |
| 5 | Sequence Number (0) ||||
| 9 | MEP ID ||||
| 13 | MEG ID (48 octets) ||||
| 17 |  ||||
| 21 |  ||||
| 25 |  ||||
| 29 |  ||||
| 33 |  ||||
| 37 |  ||||
| 41 |  ||||
| 45 |  ||||
| 49 |  ||||
| 53 |  ||||
| 57 |   |   | TxFCf ||
| 61 | TxFCf || RxFCb ||
| 65 | RxFCb || TxFCb ||
| 69 | TxFCb || Reserved (0) ||
| 73 | Reserved (0) || End TLV (0) ||

FIG. 3

INTEGRITY CHECK OPTIMIZATION SYSTEMS AND METHODS IN LIVE CONNECTIVITY FRAMES

FIELD OF THE DISCLOSURE

The present disclosure relates generally to networking systems and methods. More particularly, the present disclosure relates to integrity check optimization systems and methods in live connectivity frames such as Bidirectional Forwarding Detection (BFD) control packets in RFC 5880 and RFC 5881 or Continuity Check Messages (CCM) in IEEE 802.1ag or ITU-T Recommendation Y.1731.

BACKGROUND OF THE DISCLOSURE

In pure Layer 2 and Multiprotocol Label Switching (MPLS) networks (which is Layer 2+ or sometimes referred to as Layer 2.5), continuity techniques exist for detecting failures or implementing other changes in the data path. The Internet Architecture Board (IAB) describes an attack on the core routing infrastructure as an ideal attack that would inflict the greatest amount of damage. It recommends that live connectivity protocols protect their frames from third party intrusion attempts by authenticating all of them. However, trying to authenticate these frames is very resource consuming. Most conventional systems have no support for cryptography in the data path. Moreover, performing integrity check on each and every continuity frame is expensive, both from a resource and time perspective. It eliminates implementation of the solution in software. Implementation of the solution in hardware would require for cryptography in hardware which will make the solution expensive and not compatible with currently deployed systems. Continuity techniques such as BFD and CCMs require message transmission at a high frequency (e.g., 3.3 ms, etc.) to detect the failure of the network path. RFC 6862, "Keying and Authentication for Routing Protocols (KARP) Overview, Threats, and Requirements," (March 2013), the contents of which are incorporated by reference herein, states that BFD protocol needs be protected from replay attacks and that an integrity check associated with a message fails if an attacker tries to replay the message with a different origin.

Performing the computation of the hash for an integrity check therefore has to be performed in software even when hardware is used for live connectivity verification. This is simply a high cost and complexity of implementation without adding to the sanctity of the connection.

BRIEF SUMMARY OF THE DISCLOSURE

In an exemplary embodiment, a method includes determining an authentication mechanism between two nodes in a network path; operating the network path; performing connectivity check between the two nodes in the network path; and authenticating specific frames in the connectivity check between the two nodes with the authentication mechanism responsive to the specific frames affecting a state of the network path. The method can further include transmitting other frames in the connectivity check besides the specific frames without the authentication mechanism. The method can further include operating the network path as pure Layer-2 or Multiprotocol Label Switching (MPLS) with Operations, Administration, and Maintenance (OAM) mechanisms, wherein the connectivity check is part of the OAM mechanisms. The connectivity check can include Bidirectional Forwarding Detection (BFD), and the specific frames can include one of BFD control packets and BFD echo packets predetermined to affect the state of the network path. The connectivity check can include Bidirectional Forwarding Detection (BFD), and the specific frames can include BFD control packets with a P or an F flag enabled therein, and the method can further include enabling an A flag in the BFD control packets of the specific frames and using the authentication mechanism. The connectivity check can include Bidirectional Forwarding Detection (BFD), and the specific frames can include one of BFD control packets and BFD echo packets indicating a Remote Defect Indication (RDI), an Alarm Indication Signal (AIS), and a change in operating parameters. The connectivity check can include IEEE 802.1ag-2007 or G.8013/Y.1731, and the specific frames can include Continuity Check Message (CCM) Protocol Data Units (PDUs) predetermined to affect the state of the network path. The authentication mechanism can be performed in software at the two nodes. The specific frames can include any frames in any of Open Shortest Path First (OSPF) [RFC2328], Intermediate System-Intermediate System (IS-IS) [RFC1195], and Routing Information Protocol (RIP) [RFC2453] predetermined to affect the state of the network path.

In another exemplary embodiment, a network element includes one or more ports communicatively coupled to an end node in a network path; and a controller configured to: determine an authentication mechanism with the end node; cause the network path to operate with the end node; performing connectivity check with the end node in the network path; and authenticate specific frames in the connectivity check with the end node with the authentication mechanism responsive to the specific frames affecting a state of the network path. In yet another exemplary embodiment, a network includes a first node; and a second node communicatively coupled to the first node and forming a network path operating pure Layer-2 or Multiprotocol Label Switching (MPLS) with Operations, Administration, and Maintenance (OAM) mechanisms; wherein a plurality of frames are exchanged between the first node and the second node as part of the OAM mechanisms, and the plurality of frames are classified as one of affecting a state of the network path or not affecting the state of the network path; and wherein the first node and the second node are configured to authenticate the plurality of frames classified as affecting a state of the network path and to not authenticate the plurality of frames classified as not affecting the state of the network path. The plurality of frames can utilize Bidirectional Forwarding Detection (BFD).

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a Bidirectional Forwarding Detection (BFD) control packet;

FIG. 3 is a block diagram of an exemplary Continuity Check Message (CCM) protocol data unit (PDU);

DETAILED DESCRIPTION OF THE DISCLOSURE

In various exemplary embodiments, a method, a network element, and a network include determining an authentication mechanism between two nodes in a network path; operating the network path; performing connectivity check between the two nodes in the network path; and authenticating specific frames in the connectivity check between the two nodes with the authentication mechanism responsive to the specific frames affecting a state of the network path. The frames can be Bidirectional Forwarding Detection (BFD), Continuity Check Messages (CCMs), etc. Advantageously, the method, network element, and network reduce the computational load of providing authentication while maintaining secure authentication for important frames, i.e., ones that affect the state of the network path.

Figure 1:
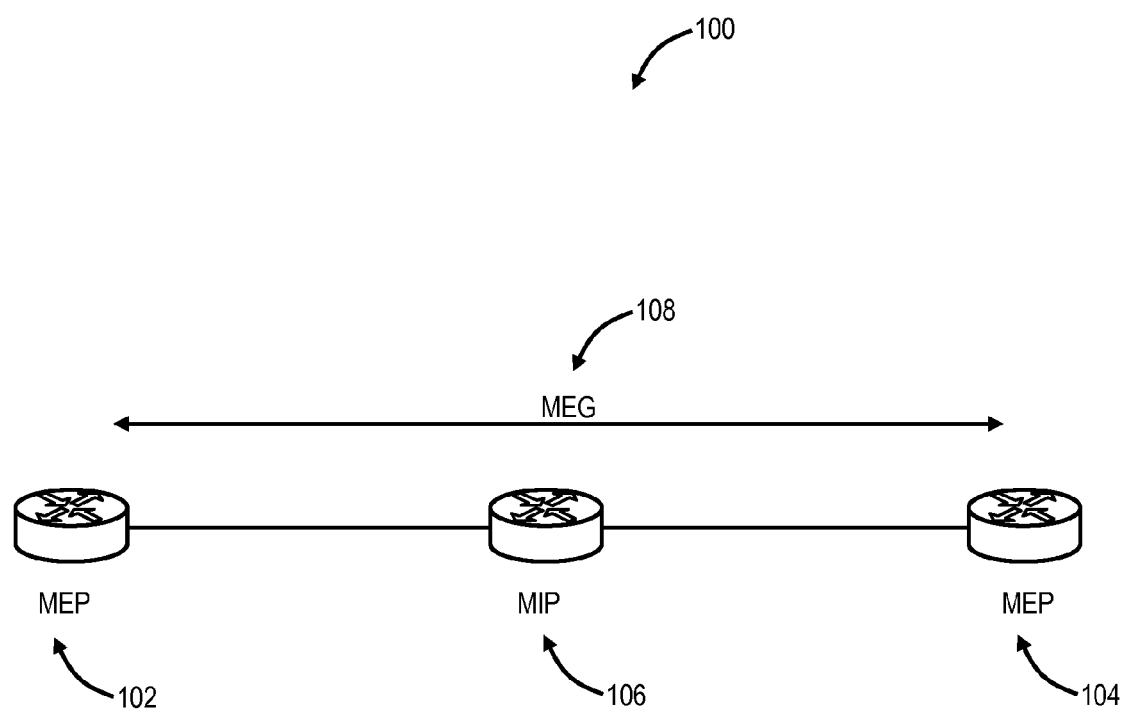
FIG. 1 is a network diagram of an exemplary Ethernet network configured with Operations, Administration, and Maintenance (OAM) mechanisms.

Referring to FIG. 1, in an exemplary embodiment, a network diagram illustrates an exemplary Ethernet network 100 configured with Operations, Administration, and Maintenance (OAM) mechanisms. For illustration purposes, the Ethernet network 100 includes three interconnected network elements 102, 104, 106. The Ethernet network 100 includes connectivity checks in the OAM mechanisms. In an exemplary embodiment, the connectivity checks can include BFD packets such as defined in RFC 5880, "Bidirectional Forwarding Detection (BFD)" (June 2010) and RFC 5881, "Bidirectional Forwarding Detection (BFD) for IPv4 and IPv6 (Single Hop)" (June 2010), the contents of each are incorporated by reference herein. In another exemplary embodiment, the connectivity checks can include CCMs such as defined in IEEE 802.1ag (2007), "IEEE Standard for Local and Metropolitan Area Networks Virtual Bridged Local Area Networks Amendment 5: Connectivity Fault Management," or ITU-T Recommendation G.8031/Y.1731, "OAM functions and mechanisms for Ethernet based networks" (November 2013), the contents of each are incorporated by reference herein. The OAM mechanisms as described herein can include BFD, IEEE 802.1ag, or G.8031/Y.1731. For example, BFD packets can be used in when the Ethernet network 100 is MPLS-based and CCMs can be used when the Ethernet network 100 is pure Layer-2. The integrity check optimization systems and methods described herein contemplate operation with BFD packets, CCMs, or any other type of live connectivity check techniques.

Fundamental to the OAM mechanisms is the concept of a Maintenance Entity (ME) or a Maintenance Association (MA), which is the identified network transport construct spanning the various network nodes underlying a given service or set of services. The OAM mechanisms relies on well-defined messages exchanged between the network elements, specifically and in particular each Maintenance End Point (MEP) that provides origination and termination of the service transport path(s) for a ME or MA. In the example of FIG. 1, the network elements 102, 104 are defined as a MEG End Point (MEP). In the OAM mechanisms, a MEP is configured to source and sink BFD packets, CCMs, etc., i.e. source and sink within a single configured MD (Maintenance Domain), pass-thru if MD Level is higher than the configured level for the MEP, and discard if MD Level is lower. The MEPs 102, 104 are also configured to participate in performance monitoring and live connectivity checks. In a point-to-point network such as illustrated in FIG. 1, there are two MEP nodes at the endpoints, and in other configurations as are also contemplated by the integrity check optimization systems and methods, there may be multiple MEP nodes. Also, a domain having one or more Maintenance Intermediate Point (MIP) nodes that may be bounded by a plurality of MEP nodes. In order that BFD packets, CCMs, etc. flows are appropriately filtered so that they are processed only by the intended domain's nodes, the MEP/MIP population of the Ethernet network 100 is configured appropriately.

The network element 106 is defined as a MIP which resides between MEPs, i.e. the MIP 106 is communicatively coupled between the MEPs 102, 104. A MIP is configured to process and forward BFD packets, CCMs, etc., but does not initiate BFD packets, CCMs, etc. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the integrity check optimization systems and methods described herein. Various terminology utilized herein, such as MEP, MIP, etc. is common to each of IEEE 802.1ag-2007, G.8013/Y.1731, BFD, etc. IEEE 802.1ag-2007 utilizes the term Maintenance Association (MA) whereas G.8013/Y.1731 and BFD utilize Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering the constructs of IEEE 802.1ag-2007, G.8013/Y.1731, MEF, BFD, etc.

In one aspect of the OAM mechanisms, BFD packets and CCMs provide mechanisms for connectivity verification. Collectively, the BFD packets and CCMs can be referred to as connectivity check (CC) frames. The CC frames are generally used to verify connectivity of a path. BFD is used to detect faults between two forwarding engines connected by a link, e.g. between the MEPs 102, 104. It provides low-overhead detection of faults even on physical media that do not support failure detection of any kind, such as Ethernet, virtual circuits, tunnels and MPLS Label Switched Paths. BFD does not have a discovery mechanism; sessions must be explicitly configured between the endpoints. BFD may be used on many different underlying transport mechanisms and layers, and operates independently of all of these. Therefore, it needs to be encapsulated by whatever transport it uses. For example, monitoring MPLS LSPs involves piggybacking session establishment on LSP-Ping packets. Protocols that support some form of adjacency setup, such as OSPF or IS-IS, may also be used to bootstrap a BFD session. These protocols may then use BFD to receive faster notification of failing links than would normally be possible using the protocol's own keep alive mechanism. A session may operate in one of two modes: asynchronous mode and demand mode. In asynchronous mode, both endpoints periodically send Hello packets to each other. If a number of those packets are not received, the session is considered down. In demand mode, no Hello packets are exchanged after the session is established; it is assumed that the endpoints have another way to verify connectivity to each other, perhaps on the underlying physical layer. However, either host may still send Hello packets if needed. Regardless of which mode is in use, either endpoint may also initiate an Echo function. When this function is active, a stream of Echo packets is sent, and the other endpoint then sends these back to the sender via its forwarding plane. This is used to test the forwarding path on the remote system.

In an exemplary embodiment, the Ethernet network 100 can include a first node (e.g., the MEP 102); and a second node (e.g., the MEP 104) communicatively coupled to the first node and forming a network path operating pure Layer-2 or Multiprotocol Label Switching (MPLS) with Operations, Administration, and Maintenance (OAM) mechanisms; wherein a plurality of frames are exchanged between the first node and the second node as part of the OAM mechanisms, and the plurality of frames are classified as one of affecting a state of the network path or not affecting the state of the network path; and wherein the first node and the second node are configured to authenticate the plurality of frames classified as affecting a state of the network path and to not authenticate the plurality of frames classified as not affecting the state of the network path. The plurality of frames can utilize Bidirectional Forwarding Detection (BFD).

Referring to FIG. 2, in an exemplary embodiment, a block diagram illustrates a BFD control packet 150. Again, BFD establishes a session between two network devices to detect failures on the bidirectional forwarding paths between the devices and provide services for upper layer protocols. BFD provides no neighbor discovery mechanism. Protocols that BFD services notify BFD of devices to which it needs to establish sessions. After a session is established, if no BFD control packet is received from the peer within the negotiated BFD interval, BFD notifies a failure to the protocol, which then takes appropriate measures. The following table describes the various fields in the BFD control packet 150:

| | |
|---|---|
| Vers | version number of the BFD protocol, currently 1 |
| Diag | diagnosis word, indicating the reason for the last session status change of the local BFD system |
| Sta | local status of the BFD |
| P | a flag, when parameters are changed, the sender set this flag in the BFD packet, and the receiver must respond to this packet at once |
| F | a flag, this flag must be set in the packet responding to flag P |
| C | a forwarding/control separation flag, once this flag is set, control plane variation does not affect the BFD detection. For example, if the control plane is ISIS, when the ISIS resets/GR, the BFD can continually monitor the link status |
| A | an authentication flag, if this flag is set, it indicates that the session needs to be authenticated |
| D | a query request flag, if this flag is set, it indicates that the sender wishes to adopt a query mode to monitor the link |
| R | preserved bit |
| Detect Mult | a detection timeout multiple, it is used in calculating detection timeout time by the detector |
| Length | a packet length |
| My Discriminator | an identifier for the BFD session connecting to the local side |
| Your Discriminator | an identifier for the BFD session connecting to the remote side |
| Desired Min Tx Interval | the minimum sending interval of the BFD packet supported by the local side |
| Required Min Rx Interval | the minimum receiving interval of the BFD packet supported by the local side |
| Required Min Echo RX Interval | the minimum receiving interval of the Echo packet supported by the local side (it is set to 0 if the local side does not support the Echo function) |
| Auth Type | an authentication type, the current protocol provides: Simple Password, Keyed MD5, Meticulous Keyed MD5, Keyed SHA1, and Meticulous Keyed SHA1 |
| Auth Length | an authentication data length |
| Authentication Date | an authentication data area |

In addition to the BFD control packet 150, BFD supports BFD echo packets to provide a fault detection mechanism without the use of the BFD control packet 150. One end sends BFD echo packets to the peer, which returns received BFD echo packets back without processing them. No BFD echo packet format is defined, as long as the transmitting end can distinguish between sessions. Each of the BFD control packets 150 or the BFD echo packets are supposed to be authenticated according to RFC 5880 and RFC 6862. However, as described herein, this can be a resource intensive process without much benefit most of the time. The integrity check optimization systems and methods classify the BFD control packets 150 or the BFD echo packets based on whether or not they affect the state of a network path. For example, the BFD control packets 150 with the P or F flags will affect the state of the network path, and without these flags, the BFD control packets 150 could be simple HELLO message continuing verification of the network path. The BFD control packets 150 can also be configured to relay alarm indication signal (AIS) and remote defect indicator (RDI) errors between ends, and these would also affect the state of the network path.

In an exemplary embodiment, the integrity check optimization systems and methods proposes optimization for integrity check of every continuity check frames. The optimization can be achieved by carefully examining which frames affect the state of a network path and authenticating those frames only. These frames are state transition frames and generally indicate a change in the status of the network path. By authenticating these particular frames, the sender and receiver can maintain the sanctity of the state of the network path, without the need to perform integrity check on every frame. For example, the BFD control packets 150 can only be authenticated (with the A flag set) if the P or F flag is also set. Otherwise, the BFD control packets 150 are sent without authentication. The integrity check optimization systems and methods alleviate the need to perform an integrity check on each and every continuity check frame, and instead chooses to perform integrity check on certain frames that affect the state of a network path. Attacking frames that do not affect the state of the network path will have no impact on the sanctity of the network path. By doing so, most systems should be able to implement and support authentication of continuity check frames in software or hardware. By enabling integrity check on certain frames, it enables its implementation on both low end and high end platforms while preserving the sanctity of a connection from third party injection attacks.

A network device should not change the status of the network path unless it is able to validate these frames for their integrity. These frames are not as frequent as the frames that maintain the status quo. The rest of the frames are sent without integrity check enabled. Integrity check of frames require that they carry a sequence number in the payload of the packet. The sequence number could be incremented with every packet or could be incremented for packets that have integrity check enabled. To enable integrity check on the path, keys need to be distributed to the network elements where the path originates or terminates. There are well defined mechanisms for the key distribution, including manual key distribution and while automatic methods are being defined.

CFM includes Continuity Check Messages (CCM) which may generally be referred to as "heart beat" messages for CFM. That is, CCMs provide a mechanism to detect connectivity failures in a Maintenance Entity Group (MEG) or a Maintenance Association (MA). CCMs are multicast messages that are confined to a MEG Level or a Maintenance Domain (MD). These messages are unidirectional and do not solicit a response. Each Maintenance End Point (MEP) transmits a periodic multicast CCM inward towards the other MEPs. Conventionally, CCM related attributes are statically configured in IEEE 802.1ag-2007, G.8013/Y.1731, and the MEF. In order to change the attributes, static reconfiguration is required. Also, MEPs are statically configured in IEEE 802.1ag-2007, G.8013/Y.1731, MEF 17, etc. In order to add or remove a MEP from a MEG or a MA, static reconfiguration is also needed.

Referring to FIG. 3, in an exemplary embodiment, a block diagram illustrates an exemplary CCM protocol data unit (PDU) 180. As described herein, the CCM PDU 180 is multicast from MEPs to all MIPs and MEPs associated with a given MA/MEG. In an exemplary embodiment, the CCM PDU 180 is a G.8013/Y.1731 Ethernet Continuity Check (ETH-CC) PDU. Generally, CCMs refer to the overall PDU whereas the ETH-CC represents the information contained therein. The ETH-CC function is used for proactive OAM such as to detect loss of continuity (LOC) between any pair of MEPs in a MEG, unintended connectivity between two MEGs (Mismerge), unintended connectivity within the MEG with an unexpected MEP (Unexpected MEP), and other defect conditions (e.g. Unexpected MEG Level, Unexpected Period, etc.). Thus, the CCM is applicable for fault management, performance monitoring, or protection switching applications. In operation, upon reception, a MEP reports a frame with unexpected ETH-CC information. As described herein, CCM transmission may be enabled or disabled in a MEG/MA. When CCM transmission is enabled in a MEG/MA, all MEPs are enabled to periodically transmit frames with ETH-CC information to all other MEPs in the MEG/MA. The CCM transmission period may be the same for all MEPs in the MEG/MA. When a MEP is enabled to generate frames with ETH-CC information, it also expects to receive frames with ETH-CC information from its peer MEPs in the MEG/MA.

The CCM PDU 180 may include a MEG Level (MEL) which is a 3-bit field containing an integer value (0 to 7) that identifies the MEG Level of the CCM PDU 180. A Version field is a 5-bit field containing an integer value that identifies the OAM protocol version. An OpCode is a 1-octet field containing an OpCode that identifies an OAM PDU type, and in the case of the CCM PDU 180 is set to 1. The OpCode is used to identify the remaining content of an OAM PDU. A Flag field is an 8-bit field dependent on the OAM PDU type, and in the case of the CCM PDU 180 contains two information elements for Remote Defect Indication (RDI) and Period. A first bit of the Flag field (bit 8) is a single bit for RDI which is set to 1 to indicate a remote defect, and otherwise is set to 0. The last three bits of the Flag field (bits 3 to 1) indicate a transmission period for the CCM PDU 180 as illustrated in the following table:

| Flags [3:1] | Period Value | Comments |
| --- | --- | --- |
| 000 | Invalid Value | Invalid value for CCM PDUs |
| 001 | 3.33 ms | 300 frames per second |
| 010 | 10 ms | 100 frames per second |
| 011 | 100 ms | 10 frames per second |
| 100 | 1 s | 1 frame per second |
| 101 | 10 s | 6 frames per minute |
| 110 | 1 min | 1 frame per minute |
| 111 | 10 min | 6 frame per hour |

Similar to the BFD control packets 150, in an exemplary embodiment, the integrity check optimization systems and methods can be used with the CCM PDUs 180. Specifically, the CCM PDUs 180 can be sent with authentication if they affect the state of the network path, e.g. changing the transmission period or transmitting RDI. Note, the authentication can be provided in the reserved fields of the CCM PDU 180.

Figure 4:
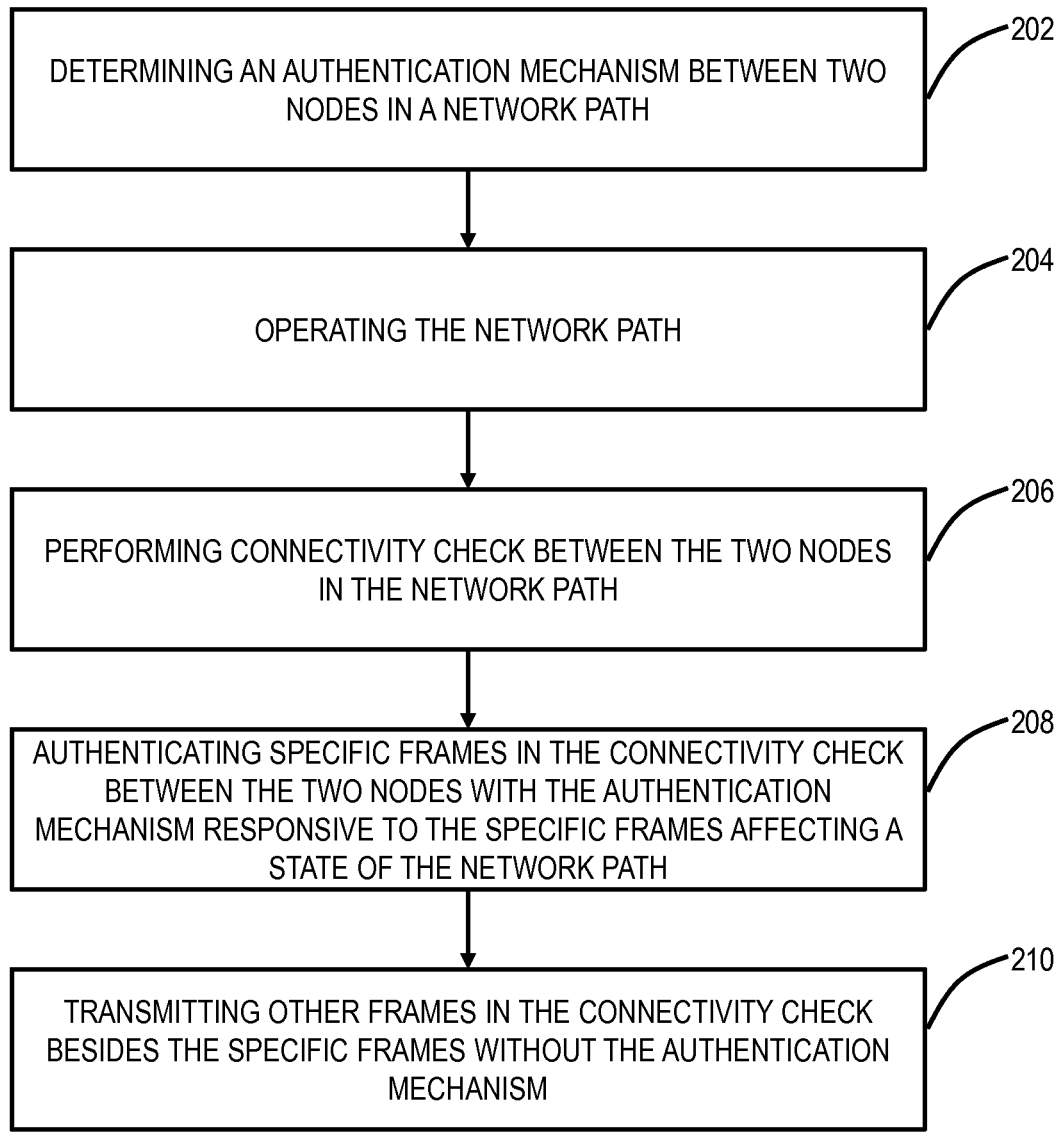
FIG. 4 is a flowchart of an integrity check optimization method.

Referring to FIG. 4, in an exemplary embodiment, a flowchart illustrates an integrity check optimization method 200. The integrity check optimization method 200 contemplates operation in the Ethernet network 100 between the nodes 102, 104, in a network element 300 (FIG. 5), and the like. The integrity check optimization method 200 seeks to optimize authentication of OAM frames or the like in a network path. Again, most systems today have no support for cryptography (hardware) in the data path or network path. Moreover, performing integrity check on each and every frame is expensive, both from a resource and time perspective. It eliminates implementation of the solution in software. Implementation of the solution in hardware would require for cryptography in hardware which will make the solution expensive and not compatible with existing non-compliant systems. To that end, the integrity check optimization method 200 can provide software-based authentication, but on a limited basis, i.e., only when needed when the frames will have an impact on the network path. The optimization can be achieved by determining which frames affect the state of a network path and authenticating those frames only. These frames are state transition frames and generally indicate a change in the status of the network path. By authenticating these particular frames, the sender and receiver can maintain the sanctity of the state of the path, without the need to perform integrity check on every frame. By identifying and sending only certain frames for integrity check, the computational load is reduced in a way that both low-end and high-end systems can enable integrity check. Nodes at both end have to recognize which frames are enabled for integrity check and perform the integration.

The integrity check optimization method 200 includes determining an authentication mechanism between two nodes in a network path (step 202). To enable integrity check on the network path, keys need to be distributed to the two nodes where the path originates or terminates. There are well defined mechanisms for the key distribution, including manual key distribution and while automatic methods are being defined. For example, the authentication mechanism can include a simple password, Keyed Message Digest 5 (MD5), Meticulous Keyed MD5, Keyed Secure Hash Algorithm (SHA1), Meticulous Keyed SHA1, and the like. The simple password can be a binary string from 1 to 16 bytes in length. Other embodiments for the authentication mechanism are also contemplated. The integrity check optimization method 200 next includes operating the network path (step 204). Here, data is exchanged over the network path. The integrity check optimization method 200 includes performing connectivity check between the two nodes in the network path (step 206). The performing is done while the network path is operating. As discussed herein, the connectivity check provides OAM mechanisms over the network path including live connectivity checks. The connectivity check can also affect the state of the network path by, for example, changing connectivity intervals, signaling a remote defect indication (RDI), signaling an alarm indication signal (AIS), etc.

The connectivity check can include, without limitation, the BFD control packets 150, BFD echo packets, the CCM PDUs 180, and the like. Additionally, the connectivity check can be extended to any frame in any protocol which affects a change in the network path, for example, in OSPF [RFC2328], IS-IS [RFC1195], RIP [RFC2453], etc. The integrity check optimization method 200 includes authenticating specific frames in the connectivity check between the two nodes with the authentication mechanism responsive to the specific frames affecting a state of the network path (step 208). As described herein, various RFCs state:

Routing Protocols (or the transport or network mechanism protecting routing protocols) should be able to detect and reject replayed intra-session and inter-session messages. Packets captured from one session must be able to be resent and accepted during a later session (i.e., inter-session replay). Additionally, replay mechanisms must work correctly even in the presence of routing protocol packet prioritization by the router.

There is a specific case of replay attack combined with spoofing that must be addressed. Several routing protocols (e.g., OSPF [RFC2328], IS-IS [RFC1195], BFD [RFC5880], RIP [RFC2453], etc.), require all speakers to share the same authentication and message association key on a broadcast segment. It is important that an integrity check associated with a message fail if an attacker has replayed the message with a different origin.

The integrity check optimization method 200 seek to address these concerns, but in an optimized manner, i.e., authentication only when required. The integrity check optimization method 200 also includes transmitting other frames in the connectivity check besides the specific frames without the authentication mechanism (step 210). As described herein, it is expected the vast majority of the frames in the connectivity check will be the other frames which do not require authentication. Thus, the overall computation load is reduced while security is preserved.

Again, the integrity check optimization method 200 has been described herein with specific reference to BFD (the BFD control packets 150 and the BFD echo packets) and IEEE 802.1ag-2007/G.8013/Y.1731 (the CCM PDUs 180). However, those of ordinary skill in the art will recognize the integrity check optimization method 200 can be extended to any Routing Protocol or the transport or network mechanisms protecting routing protocols. That is, authentication need not be on every frame, just the important frames which are defined herein as affecting the state of the network path. These frames can be determined ahead of time and the two nodes can be configured to require authentication on these frames before taking any associated action based thereon. The integrity check optimization method 200 can also be used in Open Shortest Path First (OSPF) [RFC2328], Intermediate System-Intermediate System (IS-IS) [RFC1195], Routing Information Protocol (RIP) [RFC2453], and the like. Advantageously, the integrity check optimization method 200 allows deployment on low-end to high-end systems and does not require specific cryptography hardware since authentication is infrequent and can be done in software without consuming too many resources. Authenticating all frames in software is computationally challenging.

The integrity check optimization method 200 can also include operating the network path as pure Layer-2 or Multiprotocol Label Switching (MPLS) with Operations, Administration, and Maintenance (OAM) mechanisms, wherein the connectivity check is part of the OAM mechanisms. The connectivity check can include Bidirectional Forwarding Detection (BFD), and the specific frames can include one of BFD control packets and BFD echo packets predetermined to affect the state of the network path. The connectivity check can include Bidirectional Forwarding Detection (BFD), and the specific frames can include BFD control packets with a P or an F flag enabled therein, and the integrity check optimization method 200 can further include enabling an A flag in the BFD control packets of the specific frames and using the authentication mechanism. The connectivity check can include Bidirectional Forwarding Detection (BFD), and the specific frames can include one of BFD control packets and BFD echo packets indicating a Remote Defect Indication (RDI), an Alarm Indication Signal (AIS), and a change in operating parameters. The connectivity check can include IEEE 802.1 ag-2007 or G.8013/Y.1731, and the specific frames can include Continuity Check Message (CCM) Protocol Data Units (PDUs) predetermined to affect the state of the network path. The authentication mechanism can be performed in software at the two nodes. The specific frames can include any frames in any of Open Shortest Path First (OSPF) [RFC2328], Intermediate System-Intermediate System (IS-IS) [RFC1195], and Routing Information Protocol (RIP) [RFC2453] predetermined to affect the state of the network path.

Figure 5:
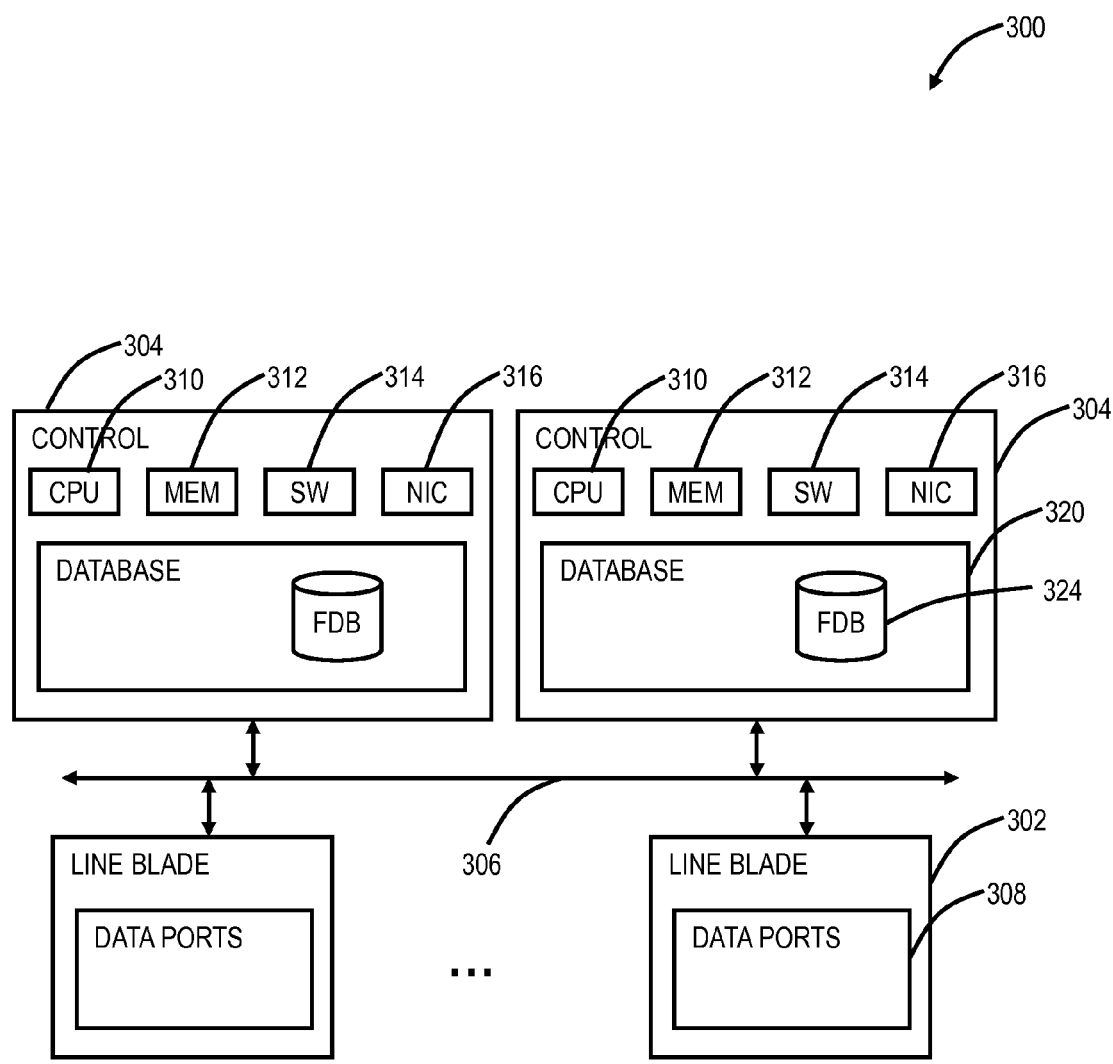
FIG. 5 is a block diagram of an exemplary implementation of a network element for the nodes in the Ethernet network of FIG. 1.

Referring to FIG. 5, in an exemplary embodiment, a block diagram illustrates an exemplary implementation of a network element 300 for the nodes 102, 104, 106. In this exemplary embodiment, the network element 300 is an Ethernet network switch, but those of ordinary skill in the art will recognize the present invention contemplates other types of network elements and other implementations, such as, for example, a layer two switch integrated within an optical network element. In this exemplary embodiment, the network element 300 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e. the network element 300. In another exemplary embodiment, the functionality of each of the blades 302, 304 may be integrated within a single module, such as in the layer two switch integrated within an optical network element. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 300 out by the correct port 308 to the next network element. "Switching fabric" includes switching units, or individual boxes, in a node; integrated circuits contained in the switching units; and programming that allows switching paths to be controlled.

The control blades 304 include a microprocessor 310, memory 312, software 314, and a network interface 316 to operate within the network 100. Specifically, the microprocessor 310, the memory 312, and the software 314 may collectively control, configure, provision, monitor, etc. the network element 300. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this exemplary embodiment, the network element 300 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 300. In an exemplary embodiment, the blades 302, 304 are configured to implement the integrity check optimization method 200 as described herein. The network element 300 can be implemented as the MEPs 102, 104 or the MIP 106 and implement the integrity check optimization method 200 described herein.

Specifically, the network element 300 can be the MEPs 102, 104 or the MIP 106 based on provisioning and configuration. The network element 300 can include one or more ports communicatively coupled to an end node in a network path; and a controller configured to: determine an authentication mechanism with the end node; cause the network path to operate with the end node; performing connectivity check with the end node in the network path; and authenticate specific frames in the connectivity check with the end node with the authentication mechanism responsive to the specific frames affecting a state of the network path. The controller can be further configured to transmit other frames in the connectivity check besides the specific frames without the authentication mechanism. The controller can be further configured to cause the network path to be operated as pure Layer-2 or Multiprotocol Label Switching (MPLS) with Operations, Administration, and Maintenance (OAM) mechanisms, wherein the connectivity check is part of the OAM mechanisms. The connectivity check can include Bidirectional Forwarding Detection (BFD), and the specific frames can include one of BFD control packets and BFD echo packets predetermined to affect the state of the network path.

The connectivity check can include Bidirectional Forwarding Detection (BFD), and the specific frames can include BFD control packets with a P or an F flag enabled therein, and wherein the controller can be further configured to: cause an A flag to be enabled in the BFD control packets of the specific frames and using the authentication mechanism. The connectivity check can include Bidirectional Forwarding Detection (BFD), and the specific frames can include one of BFD control packets and BFD echo packets indicating a Remote Defect Indication (RDI), an Alarm Indication Signal (AIS), and a change in operating parameters. The connectivity check can include IEEE 802.1ag-2007 or G.8013/Y.1731, and the specific frames can include Continuity Check Message (CCM) Protocol Data Units (PDUs) predetermined to affect the state of the network path. The authentication mechanism can be performed in software by the controller. The specific frames can include any frames in any of Open Shortest Path First (OSPF) [RFC2328], Intermediate System-Intermediate System (IS-IS) [RFC1195], and Routing Information Protocol (RIP) [RFC2453] predetermined to affect the state of the network path.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
    determining an authentication mechanism between two nodes in a network path;
    operating the network path;
    performing connectivity check between the two nodes in the network path, wherein the connectivity check comprises any of Bidirectional Forwarding Detection (BFD), IEEE 802.1ag-2007, and G.8013/Y.1731; and
    authenticating only specific frames affecting a state of the network path in the connectivity check between the two nodes with the authentication mechanism, and wherein the specific frames comprise any of i) BFD control packets with a P or an F flag enabled therein, ii) any of BFD control packets, BFD echo packets, or Continuity Check Message (CCM) frames indicating any of a Remote Defect Indication (RDI), an Alarm Indication Signal (AIS), and a change in operating parameters, and iii) any frames related to Open Shortest Path First (OSPF) [RFC2328], Intermediate System-Intermediate System (IS-IS) [RFC1195], and Routing Information Protocol (RIP) [RFC2453] predetermined to affect the state of the network path.

2. The method of claim 1, further comprising:
    transmitting other frames in the connectivity check besides the specific frames without the authentication mechanism.

3. The method of claim 1, further comprising:
    operating the network path as pure Layer-2 or Multiprotocol Label Switching (MPLS) with Operations, Administration, and Maintenance (OAM) mechanisms, wherein the connectivity check is part of the OAM mechanisms.

4. The method of claim 1, wherein the connectivity check comprises Bidirectional Forwarding Detection (BFD), and the specific frames comprise BFD control packets with a P or an F flag enabled therein, and further comprising:
    enabling an A flag in the BFD control packets of the specific frames and using the authentication mechanism.

5. The method of claim 1, wherein the authentication mechanism is performed in software at the two nodes.

6. A network element, comprising:
    one or more ports communicatively coupled to an end node in a network path; and
    a controller configured to:
        determine an authentication mechanism with the end node;
        cause the network path to operate with the end node;
        performing connectivity check with the end node in the network path, wherein the connectivity check comprises any of Bidirectional Forwarding Detection (BFD), IEEE 802.1ag-2007, and G.8013/Y.1731; and
        authenticate only specific frames in the connectivity check with the end node with the authentication mechanism, and wherein the specific frames comprise any of i) BFD control packets with a P or an F flag enabled therein, ii) any of BFD control packets, BFD echo packets, or Continuity Check Message (CCM) frames indicating any of a Remote Defect Indication (RDI), an Alarm Indication Signal (AIS), and a change in operating parameters, and iii) any frames related to Open Shortest Path First (OSPF) [RFC2328], Intermediate System-Intermediate System (IS-IS) [RFC1195], and Routing Information Protocol (RIP) [RFC2453] predetermined to affect the state of the network path.

7. The network element of claim 6, wherein the controller is further configured to:
    transmit other frames in the connectivity check besides the specific frames without the authentication mechanism.

8. The network element of claim 6, wherein the controller is further configured to:
    cause the network path to be operated as pure Layer-2 or Multiprotocol Label Switching (MPLS) with Operations, Administration, and Maintenance (OAM) mechanisms, wherein the connectivity check is part of the OAM mechanisms.

9. The network element of claim 6, wherein the connectivity check comprises Bidirectional Forwarding Detection (BFD), and the specific frames comprise BFD control packets with a P or an F flag enabled therein, and wherein the controller is further configured to:
    cause an A flag to be enabled in the BFD control packets of the specific frames and using the authentication mechanism.

10. The network element of claim 6, wherein the authentication mechanism is performed in software by the controller.

11. A network, comprising:
    a first node; and
    a second node communicatively coupled to the first node and forming a network path operating pure Layer-2 or Multiprotocol Label Switching (MPLS) with Operations, Administration, and Maintenance (OAM) mechanisms;
    wherein a plurality of frames are exchanged between the first node and the second node as part of the OAM mechanisms, and the plurality of frames are classified as one of affecting a state of the network path or not affecting the state of the network path, and wherein the OAM mechanisms comprise any of Bidirectional Forwarding Detection (BFD), IEEE 802.1ag-2007, and G.8013/Y.1731; and
    wherein the first node and the second node are configured to authenticate only specific frames, and wherein the specific frames comprise any of i) BFD control packets with a P or an F flag enabled therein, ii) any of BFD control packets, BFD echo packets, or Continuity Check Message (CCM) frames indicating any of a Remote Defect Indication (RDI), an Alarm Indication Signal (AIS), and a change in operating parameters, and iii) any frames related to Open Shortest Path First (OSPF) [RFC2328], Intermediate System-Intermediate System (IS-IS) [RFC1195], and Routing Information Protocol (RIP) [RFC2453] predetermined to affect the state of the network path.

12. The network of claim 11, wherein the plurality of frames utilize Bidirectional Forwarding Detection (BFD).

* * * * *